United States Patent [19]

Platzer, Jr.

[11] Patent Number: 5,050,977

[45] Date of Patent: Sep. 24, 1991

[54] AUTOMOTIVE VEHICLE MIRROR WITH GAUGING VIEWING MIRROR PORTION

[76] Inventor: George E. Platzer, Jr., 424 Cypress Rd., Rochester Hills, Mich. 48309

[21] Appl. No.: 507,914

[22] Filed: Apr. 12, 1990

Related U.S. Application Data

[62] Division of Ser. No. 281,667, Dec. 9, 1988.

[51] Int. Cl.$^5$ .................... B60R 1/08; B60R 1/06; G02B 7/18
[52] U.S. Cl. ........................... 359/866; 359/872; 359/877; 74/502.1
[58] Field of Search ............ 350/627, 637, 632; 74/502.1

[56] References Cited

U.S. PATENT DOCUMENTS

| | | | |
|---|---|---|---|
| 2,763,187 | 9/1956 | Wiener | 350/627 |
| 3,131,250 | 4/1964 | Ely | 350/627 |
| 4,200,359 | 4/1980 | Lawson | 350/627 |
| 4,859,046 | 8/1989 | Traynor et al. | 350/627 |

FOREIGN PATENT DOCUMENTS

| | | | |
|---|---|---|---|
| 2744409 | 4/1979 | Fed. Rep. of Germany | 350/627 |
| 2590853 | 5/1984 | France | 350/637 |

*Primary Examiner*—Jon W. Henry
*Attorney, Agent, or Firm*—Lon H. Romanski

[57] ABSTRACT

A mirror structure, for use as a rear view mirror, is shown as having a main viewing mirror portion and an auxiliary viewing mirror portion; when the mirror structure is adjusted so that a selected reference portion, of the vehicle which carries the mirror structure, is seen in the auxiliary viewing mirror portion, the main viewing mirror portion is simultaneously positioned to provide an enhanced view of existing traffic. In another form, the mirror is first positioned so that the selected reference portion of the vehicle is viewed therein, and then the mirror is rotated a preselected amount as to present a view further angularly displaced from the vehicle as to thereby provide an enhanced view of existing traffic.

10 Claims, 10 Drawing Sheets

AUTOMOTIVE VEHICLE MIRROR WITH GAUGING VIEWING MIRROR PORTION

RELATED APPLICATION

This application is a Division of my copending application Ser. No. 281,667 filed Dec. 9, 1988, now entitled "Remote Control Mirror With Angular Viewing Adjustments".

FIELD OF THE INVENTION

This invention relates generally to mirrors and more particularly to mirrors employed in combination with automotive vehicles.

BACKGROUND OF THE INVENTION

In the past, automotive vehicles, such as, for example, automobiles, were provided with a mirror, mounted within the interior of the passenger compartment, by which the vehicle operator (driver) could obtain a view rearwardly directed of such vehicle. Such interior mounted rear view mirror was intended to enable the vehicle driver to see whether a following vehicle was in the act of passing or if the roadway, to the driver's side, was clear of vehicles thereby making it safe for that driver to, for example, pass another leading vehicle.

Subsequently, additional rear view mirrors were placed on automotive vehicles in order to expand the driver's field of view and thereby increase safety. The first of such additional mirrors was placed on the left side of the vehicle (the driver's side), externally thereof, and situated as to enable the driver to look into the mirror to obtain a better rearward view of the roadway generally to the left of the vehicle. The second of such additional mirrors was placed on the right side of the vehicle (the front passenger's side), externally thereof, and situated as to enable the driver to look into that mirror to obtain a rearward view of the roadway generally to the right of the vehicle.

The interior (or inside) mirror is, generally, the driver's primary rear view mirror; however, the viewing angle of such inside mirror is significantly limited so that relatively large areas, to both sides of the vehicle, remain unseen by the driver. (Such unseen areas may be considered as "blind zones".) Therefore, if the driver relies exclusively on the inside mirror (for providing a rear view), another vehicle, which is not within the peripheral vision of the driver, may actually be within such a blind zone and, consequently, not seen by the driver who, then, may conclude that there is no other vehicle. Such an erroneous conclusion, in turn, may result in both bodily and property injuries if the driver should execute a vehicular maneuver which is inconsistent with the actual vehicular traffic conditions. The prior art, in an attempt to remedy the aforestated conditions and problems, added the said left and right external (outside) mirrors to enlarge the driver's rearward field of view and not require the driver to turn the driver's head far to the left or far to the right in an attempt to determine whether any other vehicles were within such blind zones.

Generally, it has been accepted practice to have the right outside mirror of a convex configuration so as to still further expand the rearward field of view for the driver. However, because of such convex configuration, even though the field of view is expanded, the objects appearing in the mirror appear smaller than they would otherwise appear, for example, in a flat plane mirror. Consequently, the right outside mirror, of convex configuration, may be used by the driver to discern the presence of an object, or other vehicle, to the right side of the vehicle (or in the roadway lane to the right of the vehicle) but cannot be readily and reliably employed by the driver to accurately determine the relative distance of such other vehicle.

Also, it has been accepted practice to have the left outside (driver's side of vehicle) mirror of a planar (flat plane) configuration. Because of such planar configuration, the left outside mirror can be employed for reliably judging the distance of other vehicles rearwardly thereof. Often the driver employs the left outside mirror in an attempt to see if any other vehicle is within the blind zone (generally to the left and rearwardly of the driver's vehicle) which exists because of the limitations of the said inside mirror. However, this is a dangerous practice because of the left outside mirror (of only single flat plane configuration) still leaves a blind zone in which another vehicle may be situated and therefore not be visible to the driver even though the driver may believe to the contrary. The prior art has attempted to solve this problem by adding a relatively small convex mirror onto the otherwise single plane left outside mirror. As an example of such prior art, a 1.5 to 2.0 inches diameter convex mirror may be suitably attached to the surface of the single plane left outside mirror as with an adhesive. However, such "add-on" convex mirrors do not really solve the problems in that the distance of another vehicle, viewed in the "add-on" convex mirror, cannot be readily accurately determined and, further, such "add-on" convex mirror reduces the field of view of the flat plane mirror to which it is attached.

Accordingly, the invention herein disclosed is primarily directed to the problems created by prior art rear view mirror blind zones and to the solution thereof as well as other related and attendant problems.

SUMMARY OF THE INVENTION

According to one aspect of the invention, a method of adjusting a rear view mirror carried by a vehicle at the outside of said vehicle as to obtain a generally rearwardly directed view of enhanced safety, comprises the steps of positioning said mirror into a first mirror position whereby a driver of said vehicle while in a generally normal driving attitude is able to see within the view provided by said mirror when in said first mirror position only a relatively small portion of said vehicle situated rearwardly of said driver and said mirror, rotating said mirror generally horizontally and outwardly away from said vehicle to a second mirror position as to provide in said mirror when in said second mirror position a view for said driver which is directed further outwardly away from said vehicle, and wherein the step of rotating said mirror comprises rotation of said mirror of at least 4.5° outwardly of said vehicle from said first mirror position to said second mirror position.

In another aspect of the invention, in the combination of a vehicle having an interior rear view mirror within the passenger compartment of said vehicle and an outside rear view mirror carried by said vehicle at the outside of said vehicle, wherein said interior rear view mirror provides to a driver of said vehicle an inside viewing angle aimed generally directly rearwardly of said vehicle, wherein said inside viewing angle is generally defined at one angular side by a passenger's side limiting ray, wherein said inside viewing angle is generally defined at an angular side opposite to said one angular side by a driver's side limiting ray, wherein said outside rear view mirror provides to said driver an outside viewing angle aimed generally rearwardly of said vehicle, wherein said outside viewing angle is generally defined at one angular side by an outer limiting ray, and wherein said outside viewing angle is generally defined at an angular side opposite to said outer limiting ray by an inner limiting ray, the method of adjusting said outside rear view mirror as to obtain a view of enhanced safety within said outside viewing angle comprises the step of rotating said outside rear view mirror generally horizontally and outwardly away from said vehicle as to swing said outside viewing angle generally horizontally and outwardly away from said vehicle to the degree that said inner limiting ray does not intersect said driver's side limiting ray at any point from said vehicle and extending across a traffic lane next adjacent to said outside rear view mirror.

In still another aspect of the invention, a mirror structure, for use as a rear view mirror for an automotive vehicle and the like, comprises a main viewing mirror portion having a main reflective surface of flat planar configuration for viewing therein existing conditions of traffic, and an auxiliary viewing mirror portion having an auxiliary reflective surface of flat planar configuration for viewing therein a portion of said vehicle, wherein the plane of said main reflective surface and the plane of said auxiliary reflective surface are inclined with respect to each other so that when said portion of said vehicle is viewed in said auxiliary viewing mirror portion the view seen in said main viewing mirror portion is outwardly away from said vehicle and does not include said portion of said vehicle.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details may be omitted from one or more views.

DETAILED DESCRIPTION OF THE PREFERRED EMBODIMENTS

Figure 1:
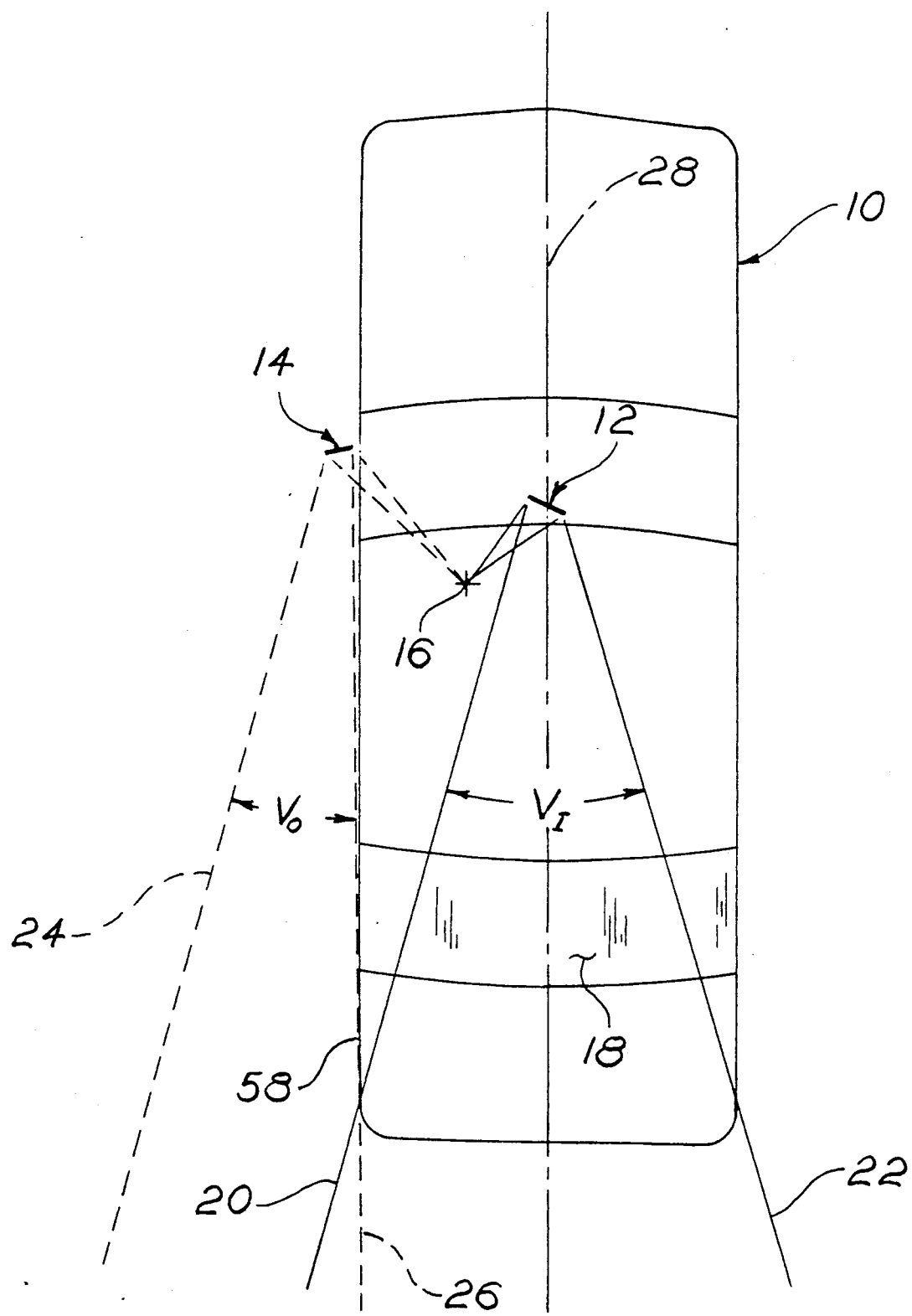
FIG. 1 is a top plan view of a simplified depiction of an automobile, provided with inside and left outside rear view mirrors, and further depicting the usual viewing angles thereof as practiced by the prior art.

Referring now in greater detail to the drawings, FIG. 1, in top plan view, depicts a vehicle, in this instance an automobile 10, having an inside mirror 12 and an outside mirror 14. The driver's eyes are represented as being centered at a point 16. By employing the inside mirror 12, the driver can look toward the rear of the vehicle 10, through the rear window 18 of vehicle 10, with a horizontal viewing angle of $V_I$ degrees depicted in FIG. 1 as bounded by and between lines 20 and 22. This, of course, assumes that none of the vehicle's structure interferes with or comes within such viewing angle of $V_I$ degrees. Using the outside mirror 14, the driver is able to look rearwardly with a horizontal viewing angle of $V_O$ degrees depicted in FIG. 1 as bounded by and between dash-lines 24 and 26. The drawing of FIG. 1 is, in effect, a simplification of the actual viewing process by the driver.

Figure 2:
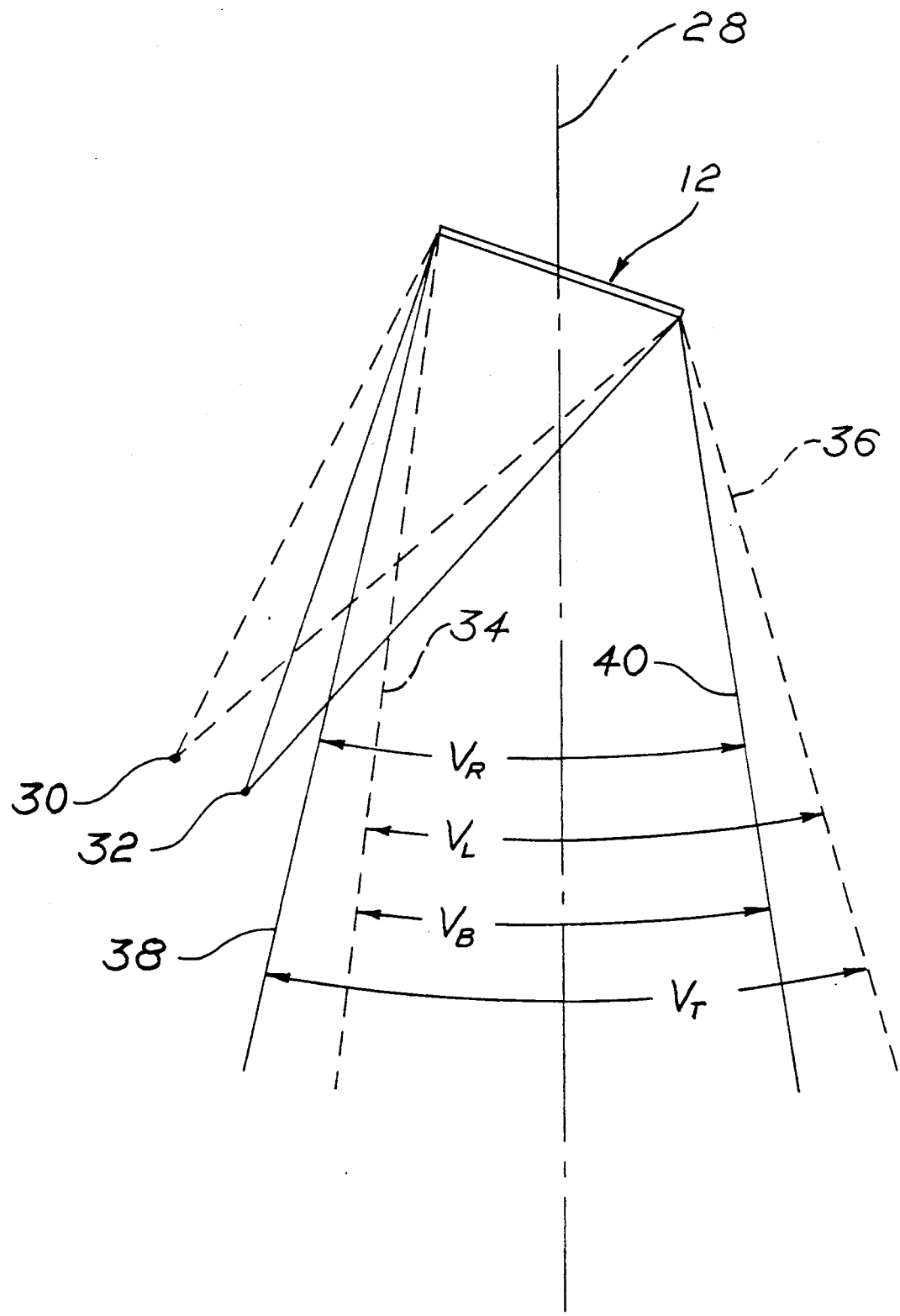
FIG. 2 is a ray diagram illustrating the binocular viewing as would occur by the vehicular driver looking into the view presented by the inside rear view mirror of a vehicle.

FIG. 2 illustrates in greater detail how the driver of the vehicle 10 actually uses the inside mirror 12. Referring in greater detail to FIG. 2, the line 28 represents the longitudinal axis of the vehicle 10 and points 30 and 32 represent the driver's left and right eyes, respectively. The inside mirror 12 is illustrated as having been slightly rotated as to provide a rearward view which is generally centered through the rear window 18 of the vehicle 10. Even though the respective depicted positions of the driver's eyes, 30 and 32, would indicate that the driver's head is turned slightly toward mirror 12, the driver's head may be facing directly forward.

In FIG. 2, the dash-lines 34 and 36 represent rays of light, from the widest horizontal locations, which can reach the driver's left eye 30 and, therefore, the horizontal viewing angle of $V_L$ degrees of the driver's left eye 30 is bounded by and between such dash-lines 34 and 36. Similarly, lines 38 and 40 represent rays of light, from the widest horizontal locations, which can reach the driver's right eye 32 and, therefore, the horizontal viewing angle of $V_R$ degrees of the driver's right eye 32 is bounded by and between such lines 38 and 40. It should be noted that, as depicted in FIG. 2, the viewing angles $V_L$ and $V_R$ overlap each other, in the medial region, thereby producing a binocular viewing angle of $V_B$ degrees, bounded by and between dash-line 34 and line 40, in which true depth perception is possible. On either side of the binocular viewing angle of $V_B$ (as between line 38 and dash-line 34 and as between line 40 and dash-line 36) the driver is still able to view objects, even though only monocularly, thereby having a total viewing angle of $V_T$ degrees bounded by and between line 38 and dash-line 36.

Figure 3:
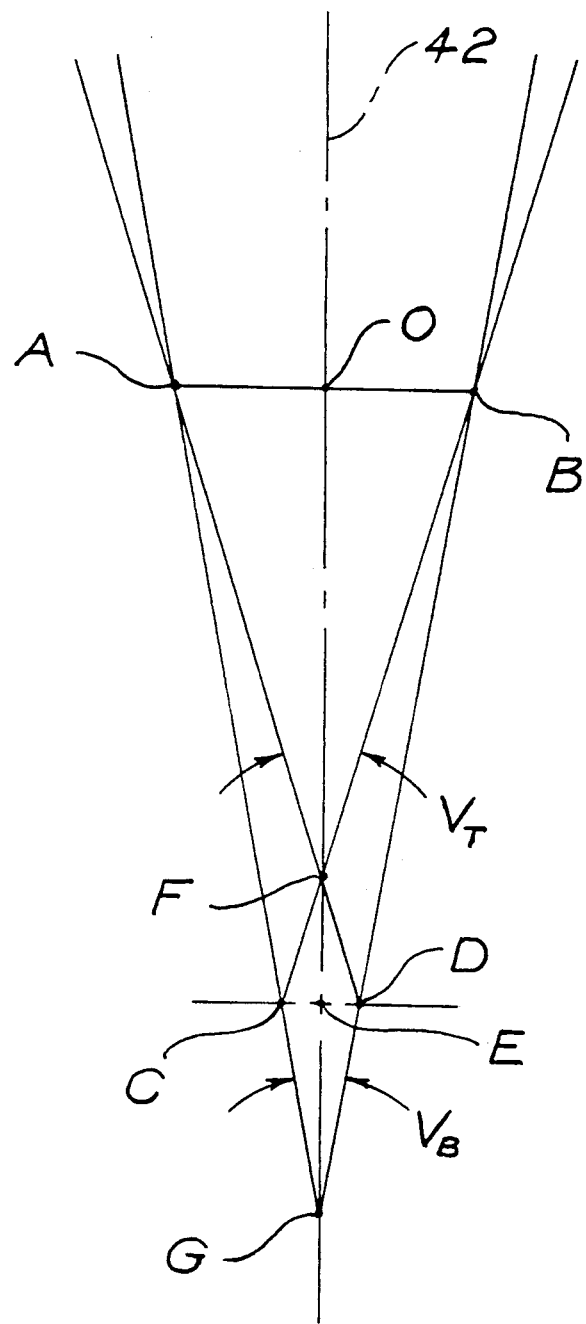
FIG. 3, a diagram, is a geometrical simplification of the drawing of FIG. 2.

The various viewing angles can be calculated in terms of the width of the mirror (as mirror 12), the distance from the driver's eyes to the mirror and the interpupillary distance of the driver's eyes. FIG. 3 geometrically depicts a mirror (such as 12) and the driver's eyes (such as 30 and 32) axially aligned with each other with such being done merely so that the geometric relationships therebetween can be more easily understood.

In FIG. 3: the line from point A to point B represents the width of the mirror (as for example mirror 12); the line from point C to point D represents the interpupillary distance as measured on the axis of the eyes (as between driver eyes 30 and 32); at the midpoint of line $\overline{AB}$ is point O; at the midpoint of axis or line $\overline{CD}$ is point E; and the line between points E and O, normal to line $\overline{AB}$ and line $\overline{CD}$, represents the distance between the mirror (as for example mirror 12) and the axis of the eyes (as for example driver's eyes 30 and 32). Also, the respective viewing rays, in FIG. 3, are carried or extended through the mirror (line $\overline{AB}$) as if the mirror were an aperture through which the eyes (at points C and D) were looking.

In FIG. 3, the angle described by the lines interconnecting points A, F and B (angle AFB) defines the total viewing angle $V_T$ while the angle described by the lines interconnecting points A, G and B (angle AGB) defines the binocular viewing angle $V_B$. In the illustration of FIG. 3, point G is determined by the intersection of the lines or viewing rays passing through and extending beyond points A and C and passing through and extending beyond points B and D. Such intersection, of course, occurs on the centerline 42 which passes through points O, F and E.

$$V_T = 2\tan^{-1} \frac{AB + CD}{2\,EO} \quad \text{(Equation No. 1)}$$

and $$V_B = 2\tan^{-1} \frac{AB - CD}{2\,EO} \quad \text{(Equation No. 2)}$$

The above Equations No. 1 and No. 2 illustrate that the following relationships exist:
1. The wider the mirror (distance $\overline{AB}$), the wider is the total viewing angle, $V_T$.
2. The closer (distance $\overline{EO}$) the eyes are to the mirror, the wider is the total viewing angle, $V_T$.
3. The greater the interpupillary distance ($\overline{CD}$), the wider is the total viewing angle, $V_T$.
4. The greater the interpupillary distance ($\overline{CD}$), the narrower is the binocular viewing angle, $V_B$.

The said Equations No. 1 and No. 2 apply to any mirror. In, for example, an automobile, the primary determinants of or the factors in establishing the viewing angles obtained from the mirrors (both inside and outside) are: the placement of the mirrors; the respective widths of the mirrors; and the position or location of the driver as gauged along the seat track of the vehicular driver's seat. Generally, it is accepted practice to have the inside mirror (such as 12) about 8.0 inches wide and the outside mirror (such as 14) about 5.5 inches wide. The eyes of the average driver may be assumed to be approximately 18.0 inches away from the inside mirror and approximately 25.0 inches away from the outside mirror. Further, the eyes of a relatively short driver may be approximately 4.0 inches closer to each of the inside and outside mirrors while the eyes of a relatively tall driver may be approximately 4.0 inches further away from each of the inside and outside mirrors.

The following table is established as a result of placing the above representative sizes and distances into said Equations No. 1 and No. 2, with the distance $\overline{CD}$ (interpupillary distance) being considered a constant equal to 2.75 inches.

| Driver Height | OUTSIDE MIRROR $\overline{AB}$ = 5.5 inches | | | INSIDE MIRROR $\overline{AB}$ = 8.0 inches | | |
|---|---|---|---|---|---|---|
| | Short | Average | Tall | Short | Average | Tall |
| $\overline{EO}$ Inches | 21 | 25 | 29 | 14 | 18 | 22 |
| $V_T$ | 22.2° | 18.7° | 16.2° | 42.0° | 33.3° | 26.7° |
| $V_B$ | 7.5° | 6.3° | 5.4° | 21.2° | 16.6° | 13.6° |

The preceding table discloses what may be considered as commonly unexpected relationships, to wit:
1. for the inside mirror, the total viewing angle, $V_T$, is about twice that of its binocular viewing angle, $V_B$;
2. for the outside mirror, the total viewing angle, $V_T$, is about three times that of its binocular viewing angle, $V_B$;
3. the total viewing angle, $V_T$, of the inside mirror is about twice the total viewing angle, $V_T$, of the outside mirror; and
4. that short drivers gain almost 50.0% in both total and binocular viewing angles as compared to tall drivers.

Generally, binocular viewing, in itself, is not of great significance in that the vehicular driver effectively uses both the binocular and monocular regions of the total viewing angles and is unaware of the transition between the two regions. Further, not only do two eyes greatly increase the total viewing angle but also the driver's head motion can be used to change the viewing direction.

Figure 4:
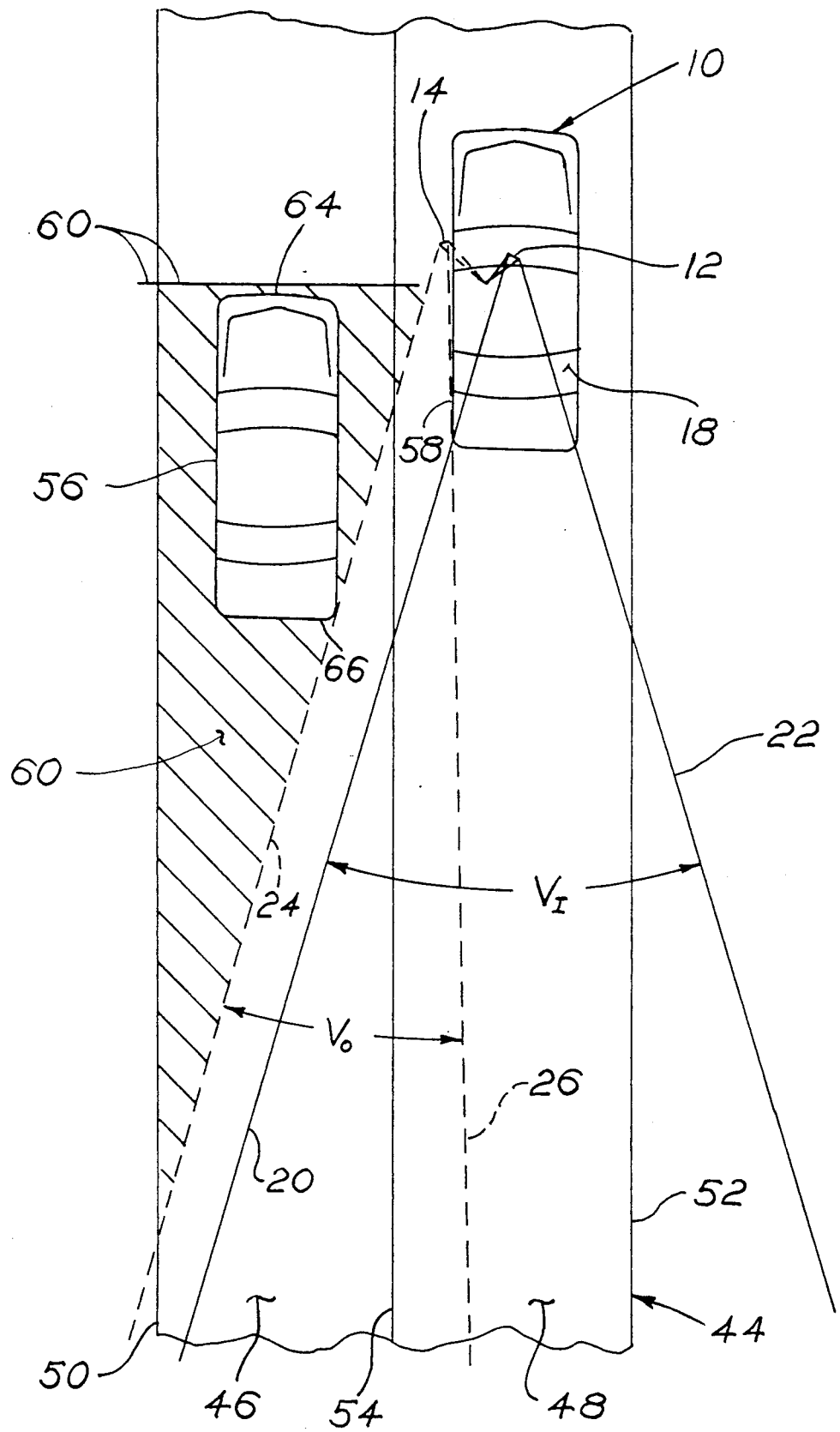
FIG. 4 is a top plan view of two automotive vehicles traveling in the same direction upon a common roadway but respectively is separate parallel lanes thereof and with the right-most vehicle employing its rear view mirrors as practiced by the prior art.

FIG. 4 depicts the viewing angles, with the magnitude of such viewing angles being calculated for an average height driver, for the vehicular inside and outside mirrors as they are usually employed in prior art practice.

Referring in greater detail to FIG. 4 a roadway 44 is shown as comprising two traffic lanes 46 and 48. The widths of such lanes are depicted by parallel lines 50 and 52 with a common medial line 54. A first vehicle, as automobile 10, is traveling in and on lane 48 while a second vehicle (as an automobile) 56 is traveling in and on lane 46 and in the same direction as vehicle 10. It should be mentioned that the drawing of FIG. 4 is generally proportioned as to represent what could be considered two mid-sized automobiles traveling on traffic lanes each of which would be approximately 12.0 feet wide.

As depicted in FIG. 4, in customary prior art usage or practice (and as previously generally discussed with reference to FIG. 1), the inside mirror 12 is adjusted by the driver to approximately center the viewing angle, as depicted by lines 20 and 22, about the longitudinal axis 28 (FIG. 1) of the vehicle 10. The outside mirror 14 is usually adjusted so that the viewing angle thereof just "picks-up" or includes a portion of the same side of the vehicle, rearwardly of the mirror 14. More specifically, as depicted in both FIGS. 1 and 4, when the outside mirror 14 is thusly adjusted, in customary prior art usage, one side of the viewing angle thereof, as represented by dash-line 26, includes within such view a portion, as at 58, of the vehicle 10.

Further, in FIG. 4, a transverse line 60 generally normal to the lanes 46 and 48 as well as to vehicle 10, is employed to represent the limit of the peripheral vision of the driver in vehicle 10 when such driver's face and eyes are directed straight forwardly. Since under such conditions (the driver of vehicle 10 facing and looking forwardly) the driver of vehicle 10 does not have a view angularly outwardly of dash-line 24 and since such driver's peripheral vision does not extend rearwardly of the peripheral vision line 60, a blind zone is created as between and extending to peripheral vision line 60 and dash-line 24. This blind zone is depicted by a series of parallel lines all at approximately 45° with respect to the lanes 46 and 48 and extending generally from dash-line 24 to peripheral vision line 60. Such blind zone is designated by reference number 62 and, as is illustrated, the second traveling vehicle 56 is within such blind zone 62 in that the forward-most portion 64 of vehicle 56 is rearwardly of the peripheral vision line 60 while the rearward portion 66 of vehicle 56 is generally forward of the limit (dash-line 24) of the total viewing angle of vehicle 10. Consequently, under the conditions discussed and illustrated, the driver of vehicle 10 would be unaware of the existance of vehicle 56 within such blind zone 62.

The inside mirror is the primary rear viewing mirror since it covers the widest angle and looks into areas which the outside mirror is unable to view. The left outside mirror is used primarily to look into the traffic lane on the left to observe vehicles that are out of view of the inside mirror. However, as shown in FIG. 4, the customary prior art practice renders the outside mirror considerably unreliable, for its intended purpose, and relatively useless for such purpose. That is, as should now become apparent, the customary prior art practice results in a large blind zone existing on the left side of the vehicle and when such vehicle should change lanes of travel, as from the right lane 48 to the left lane 46, the outside mirror provides insufficient information, to the driver of such vehicle, to assure a safe lane changing maneuver. Unfortunately, many, if not most, drivers of vehicles are unaware of the hazard involved in relying on the outside mirror for lane-change information under customary prior art practice. This lack of information exists even though an inspection of FIG. 4 will reveal that the outside mirror 14, as employed in customary prior art practice, adds about a half a vehicle length of viewing distance in the left lane 46 as compared to the view obtainable from the inside mirror 12. Obviously, such amount of additional viewing area provided by the outside mirror 14, in customary prior art practice, is insufficient.

However, it has been discovered that the outside mirror 14 can be employed in such a manner whereby the blind zone 62 is so altered or modified as to, in effect, eliminate the hazards created by such blind zone 62 of FIG. 4. This discovery, in its broad sense, comprises the turning of the outside mirror 14 farther outward as to have its viewing angle, $V_O$, effectively look into the blind zone 62. This is generally depicted in FIG. 5.

Figure 5:
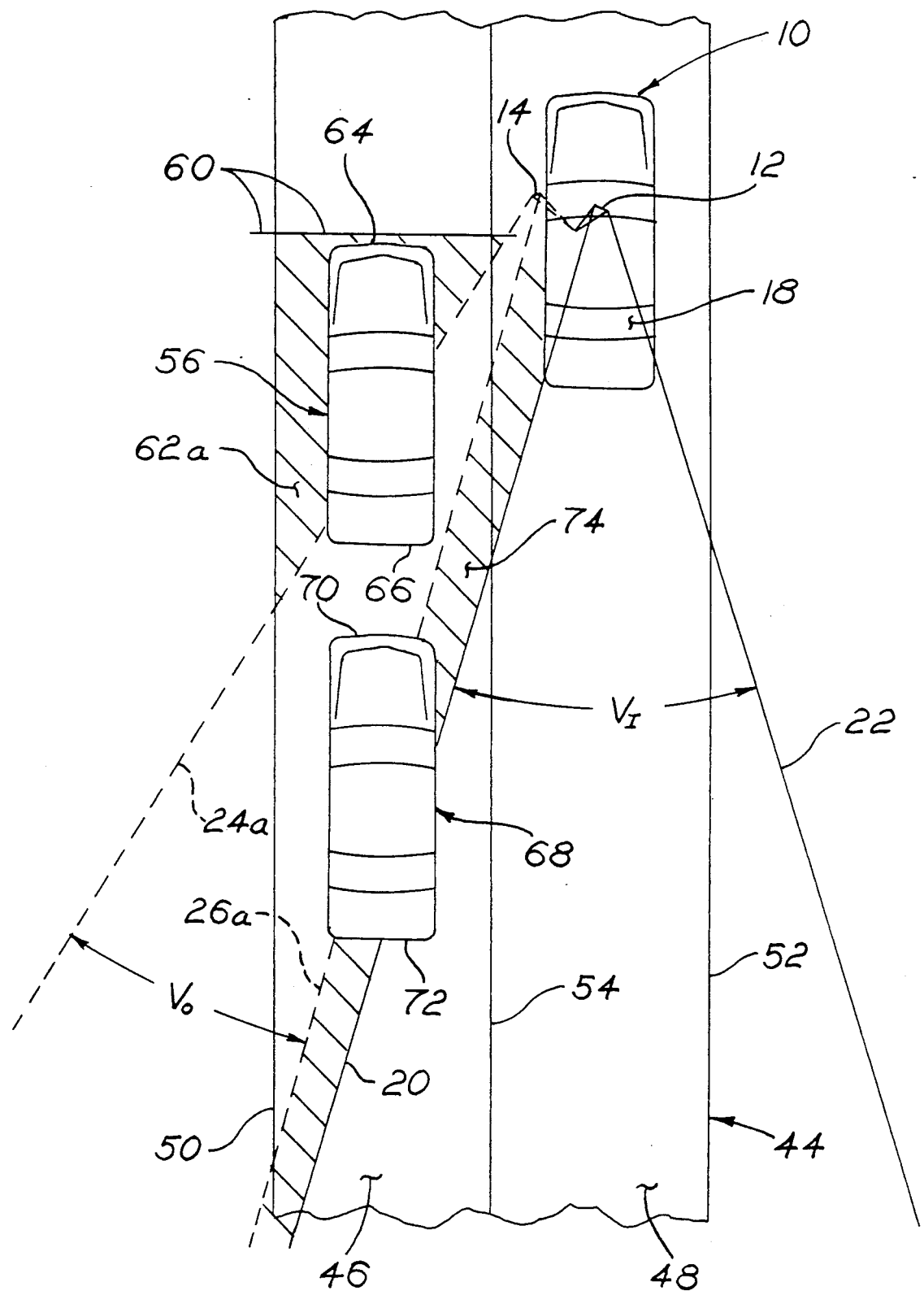
FIG. 5 is a view similar to that of FIG. 4 but with an added automotive vehicle and depicting another operational condition with the left outside mirror positioned in accordance with the teachings of this invention.

In FIG. 5, all elements which are like or similar to those of FIG. 4 are identified with like reference numbers except that each of dash-lines 24 and 26 (depicting the limits of the outside mirror viewing angle) have a suffix "a" added thereto to indicate the further turned-out viewing angle, $V_O$, of the outside viewing mirror 14 and reference number 62 has been provided with a suffix "a" to indicate the consequent reduction in the blind zone 62 of FIG. 4. Further, a third vehicle 68 has been added to the roadway 44 and placed onto lane 46 rearwardly of vehicle 56 to even further illustrate the benefits of further outwardly turning outside mirror 14.

As can be seen in FIG. 5, as a consequence of turning the outside mirror 14 farther outwardly the related viewing angle, $V_O$, is also swung outwardly drastically reducing the area or magnitude of the blind zone 62, of FIG. 4, to a relatively small blind zone 62a of FIG. 5. The outside mirror 14 may be turned farther outwardly (as compared to FIG. 4) even to the degree whereby a secondary blind zone 74 is created with such blind zone 74 existing and extending between the view limit dash-line 26a (of newly positioned viewing angle $V_O$) and the view limit line 20 (of the inside mirror viewing angle $V_I$). Therefore, even though the forward-most portion 64 of the vehicle 56 is still rearwardly of the peripheral vision line 60, the driver of vehicle 10 is now able to discern the presence of vehicle 56 in such a relative location because the rearward portion 66 of vehicle 56 now extends into the viewing angle, $V_O$, rotated to its position as defined by the area included between dash-lines 24a and 26a. Further, even though a secondary blind zone 74 may be created, the width of such is so narrow that a second vehicle 68, in lane 46, will also be visible to the driver of vehicle 10. As should be apparent from FIG. 5, there is no relative position or location which vehicle 68 can assume without the driver of vehicle 10 still being able to see it. For example, as depicted in FIG. 5, the forward portion 70 of vehicle 68 is generally forwardly of dash-line 26a (one of the limits of viewing angle, $V_I$, of inside mirror 12) and therefore visible to the driver of vehicle 10 in inside mirror 12 thereof. As should now be apparent, in the arrangement of the rotated outside mirror 14 of FIG. 5, any vehicle in the left lane 46 is always in view of either the inside mirror 12, the outside mirror 14 or the driver's (vehicle 10) eyes because of being at least partially forward of the peripheral vision line 60. With the outside mirror 14 adjusted as depicted in FIG. 5, the driver of vehicle 10 may safely maneuver from the right lane 48 and onto the left lane 46 if such driver first looks into the inside mirror 12, to see if another vehicle is already partly or wholly in the left lane 46, and then looks into the outside mirror 14 to see if another vehicle, as for example vehicle 56, may be in the left lane 46.

However, with prior art outside type rear view mirrors, there is, to say the least, a problem in attempting to adjust the outside mirror 14 to a position as depicted in FIG. 5 because the driver of such vehicle 10 has no frame of reference by which the driver can determine that the outside mirror 14 has been adjusted outwardly the proper amount. That is, most drivers have been taught to adjust the outside mirror 14 so that the driver can see just a portion of that same side of the vehicle in the viewing angle, $V_O$, of the outside mirror 14; therefore, seeing the side of the vehicle 10 in the inner edge of the viewing angle, $V_O$, of the outside mirror provides a point or frame of reference. However, if the driver of vehicle 10 were to rotate the outside mirror 14 outwardly, in an attempt to obtain a field of view, as depicted in FIG. 5, the prior art outside mirror would cease to show such a reference (the portion of the side of vehicle 10) and the driver would become confused as to exactly where he was seeing when he looked into the thusly outwardly positioned outside mirror 14.

Figure 7:
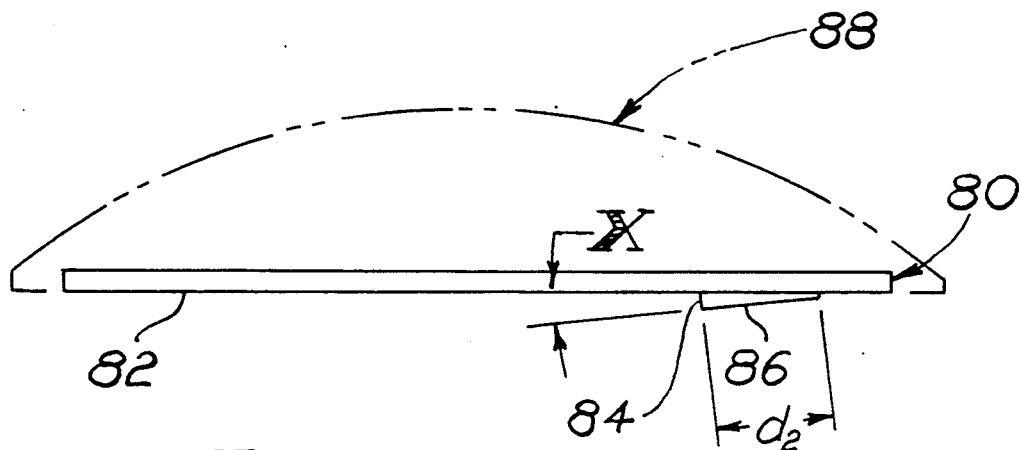
FIG. 7 is a view taken generally on the plane of line 7—7 of FIG. 6 and looking in the direction of the arrows.
Figure 6:
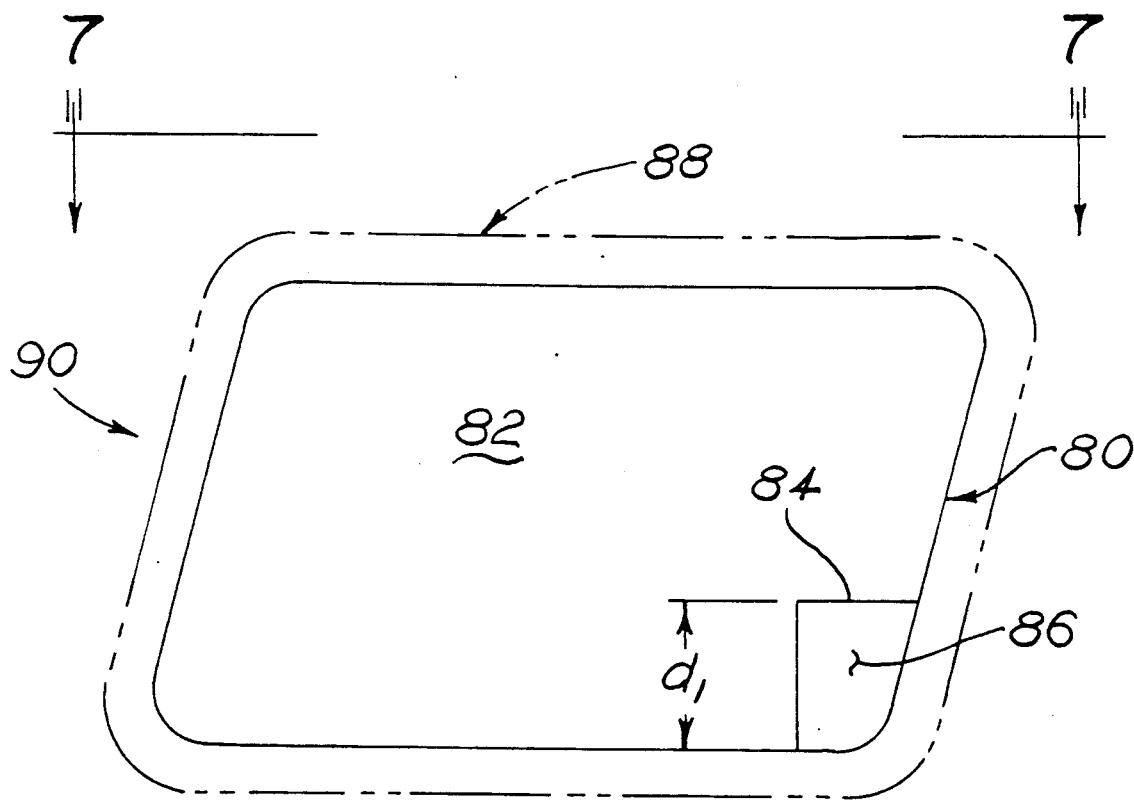
FIG. 6 is a view of a mirror embodying teachings of the invention.

FIGS. 6 and 7 illustrate a mirror employing teachings of the invention. Referring in greater detail to FIGS. 6 and 7, an outside mirror 80, preferably of a flat planar mirror surface as at 82, with a relatively small auxiliary or referencing mirror 84 carried thereby. Again, preferably, the small mirror 84 has a flat planar mirror surface 86. The mirror surface 82 may be considered as the main viewing mirror while mirror surface 86 may be considered as the auxiliary or gauging viewing mirror. As depicted, the plane of auxiliary viewing mirror 86 is situated at an angle, X, with respect to the plane of main viewing mirror 82. In the preferred embodiment, the magnitude of such angle, X, would be half of the total angle by which the viewing angle $V_O$ of either FIG. 1 or FIG. 4 would have to be rotated in order to attain a relative position as that depicted by viewing angle $V_O$ in FIG. 5. It has been determined that presently, for most automotive vehicles, the angular rotation necessary to rotate the viewing angle $V_O$ of such mirror 14 from its depicted position in either FIGS. 1 or 4 to its depicted position in FIG. 5 is about 15.0°. Therefore, in such situations the magnitude of said angle, X, would be about 7.5°. Further, if a mirror configuration in accordance with the invention were to be standardized for all vehicles, it could be that said angle, X, would be in the order of 7.5°. It has also been found that the auxiliary or gauging mirror 84 will function as desired with a height, $d_1$, thereof in the order of 1.0 inch and a width, $d_2$, thereof in the order of ⅜ inch. Preferably, the auxiliary mirror 84 is carried by mirror 80 as to be at a location generally closest to the vehicle and at a generally lowermost portion of the mirror 80. This then provides the vehicle driver with the greatest uninterrupted view, in main mirror 82, of the roadway.

Still with respect to FIGS. 6 and 7, the mirrors 80, 82 and 84, 86 may be either front surface or second surface mirrors. Generally, in the automotive field, the mirrors are usually front surface mirrors produced as by the vacuum deposition of chromium on glass. Further, the practice of the invention is not limited to either the employment of a main mirror 80 of generally parallelogram configuration or to the precise configuration of the auxiliary mirror 84 as generally depicted in FIG. 6. Also, even though in the preferred embodiment auxiliary mirror 84 would be carried by main outside mirror 80 as by having the auxiliary mirror 84 a separate member and suitably secured to the main mirror 80 as by, for example, an adhesive, the auxiliary or gauging mirror 84 may be integrally formed with main mirror 80.

Figure 8:
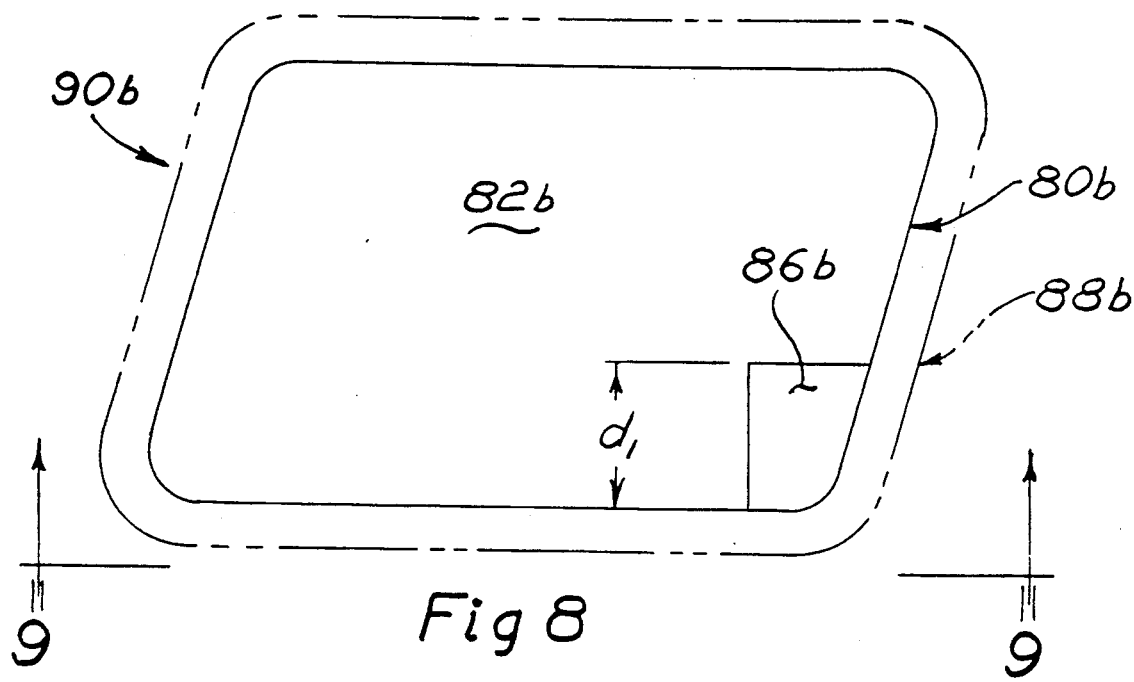
FIG. 8 is a view of another mirror embodying teachings of the invention.
Figure 9:
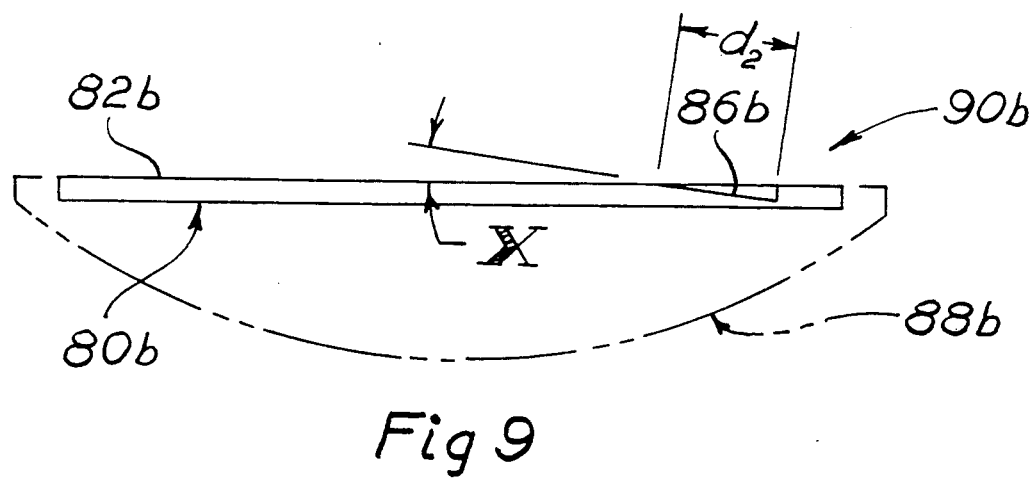
FIG. 9 is a view taken generally on the plane of line 9—9 of FIG. 8 and looking in the direction of the arrows.

FIGS. 8 and 9 illustrate another embodiment of an outside mirror employing teachings of the invention. All elements in FIGS. 8 and 9 which are like or similar to those of FIGS. 6 and 7 are identified with like reference numbers provided with a suffix "b", with the exception of angle, X, and dimensions $d_1$ and $d_2$ which are not provided with any suffix. In the main, the embodiment of FIGS. 8 and 9 differs from that of FIGS. 6 and 7 by having the auxiliary or referencing viewing mirror 86b ground into or otherwise formed into the main body or glass of outside mirror 80b. The embodiment of FIGS. 8 and 9 would be preferred if the overall mirror were to be a front surface mirror produced as by the vacuum deposition of chromium on glass. Further, all relationships and characteristics hereinbefore discussed with reference to the embodiment of FIGS. 6 and 7 apply equally well to the embodiment of FIGS. 8 and 9.

It should be made clear that the mirrors 80 and 80b (respectively of FIGS. 6 and 7 and FIGS. 8 and 9) may be employed in any overall mirror assembly. That is, referring in particular to FIGS. 6 and 7, the mirror 80 may be mounted in or carried by any suitable housing and/or carrier means depicted in simplified form and in phantom line at 88 of both FIGS. 6 and 7. Such, in turn, may be considered an overall mirror assembly 90. In this regard, the mirror assembly 90 may be of the type which is suitably pivotally mounted outside of the vehicle and requiring the driver to manually grasp the mirror assembly 90 in order to adjustably position it in a selected attitude. Also, the mirror assembly 90 may be of the type which is often referred to as being a remote manually adjustable mirror (one such structure is shown by U.S. Pat. No. 3,407,684). That is, as is well known in the art, while the mirror assembly 90 would be mounted outside of the vehicle, the driver is provided with a joystick, or some other control, situated within the vehicle, which is operatively connected to the mirror as by bowden wires or cables so that when the joystick is operated by the driver, the motion thereof is transmitted to the mirror for the remote movement and positioning of such mirror. Still further, the mirror assembly 90 may be of the type which is often referred to as being a remote electrically (or power) adjustable mirror. With such, as is well known in the art, the mirror assembly 90 would be mounted outside of the vehicle while suitable related electrical control means (which may be of the joystick type) is situated within the vehicle. Electric motors are provided for causing the mirror, as 80, to rotate or pivot about both vertical and horizontal axes to a selected attitude and activation of such electric motors is achieved and controlled by the driver through actuation of the electrical control means. It is believed that in at least the vast majority of such remote electrically adjustable mirror assemblies, the electrical motors and related drive trains are contained within the overall mirror housing which housing remains stationary while the mirror, such as 80, rotates relative to the stationary housing. Accordingly, in practicing the invention, as with the embodiment of FIGS. 6 and 7, in a remote electrically adjustable overall mirror assembly configuration, the electrical drive motors could be fixedly situated as within housing or carrier means 88 and operatively connected to the mirror 80 as to, upon actuation of the electrical control means, rotate the mirror 80 to the selected position or positions.

The foregoing, stated with regard to the embodiment of FIGS. 6 and 7, applies equally well to the embodiment of FIGS. 8 and 9.

Figure 10:
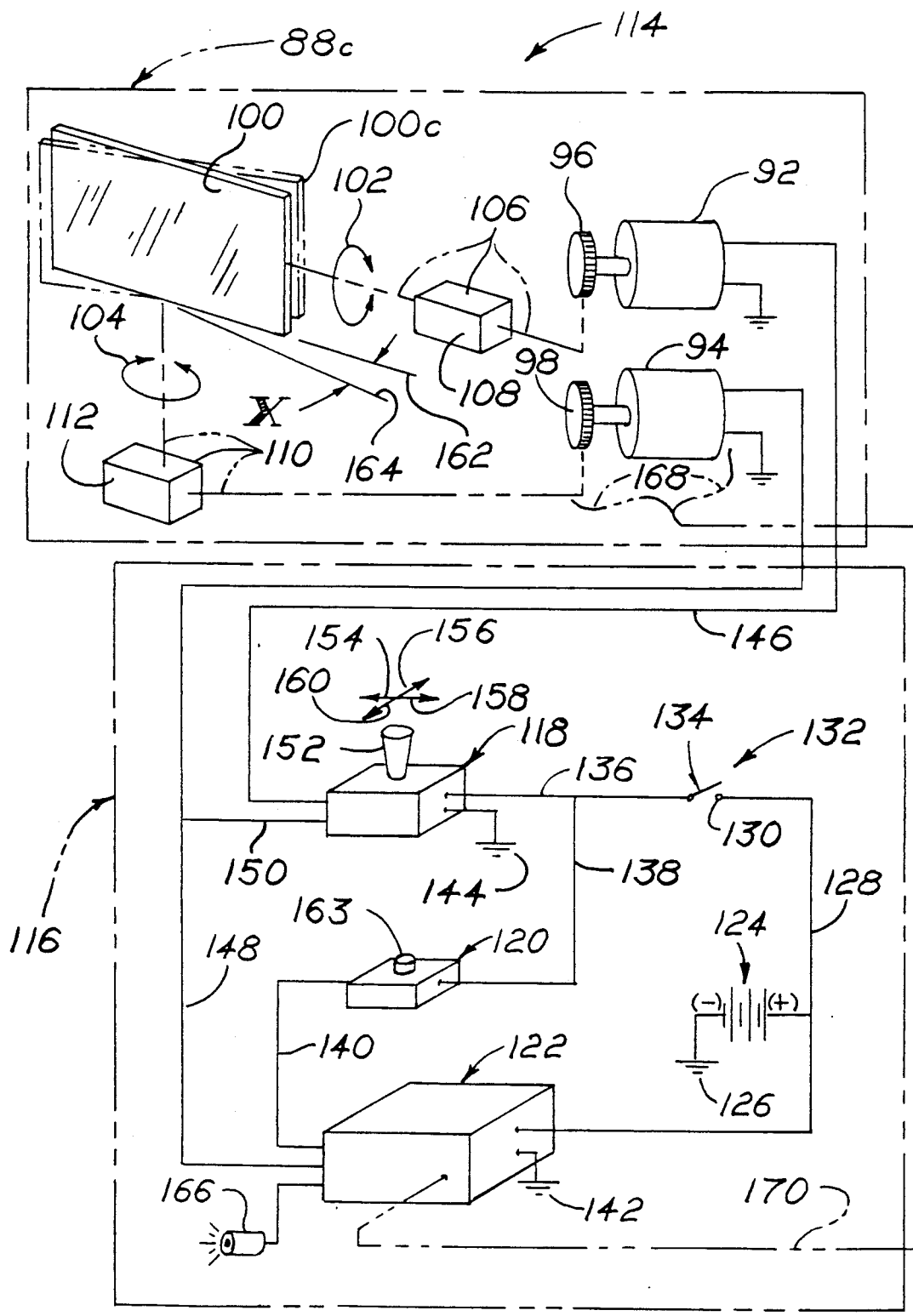
FIG. 10 is a diagrammatical and schematic representation of still further apparatus employable in the practice of the invention.

In addition to the foregoing, the invention can be practiced by yet other means, apparatus and method all of which are intended, from an operating standpoint, to eliminate the hazards of the blind zone 62 as depicted in FIG. 4. FIG. 10, illustrates one such other apparatus and method.

Referring in greater detail, FIG. 10 illustrates a pair of electric motors 92 and 94 respectively provided as with suitable gear means 96 and 98. A mirror 100, preferably of flat plane form, is depicted, schematically, as having a horizontal axis of rotational or pivotal motion as generally indicated by arrow 102, and as having a vertical axis of rotational or pivotal motion as generally indicated by arrow 104. Such dual axis motion, of course, can be achieved in a number of ways well known in the art as by, for example, the use of a cross-shaped member with respective bearing surfaces as often employed in universal joint structures.

The gear means 96 is depicted as being operatively connected to mirror 100 as by suitable motion transmitting means 106 which may comprise further gear or threaded shaft means schematically depicted at 108. Such motor means 92 and motion transmitting means 106 are effective for selectively rotating or pivoting mirror 100 in directions as generally indicated by arrow 102 thereby elevating or lowering the scene viewed by the driver.

The gear means 98 is depicted as being operatively connected to mirror 100 as by suitable motion transmitting means 110 which may comprise further gear or threaded shaft means schematically depicted at 112. Such motor means 94 and motion transmitting means 110 are effective for selectively rotating or pivoting mirror 100 in directions as generally indicated by arrow 104 thereby horizontally varying the scene viewed by the driver. As previously described with reference to the embodiments of FIGS. 6 and 8, all of the motion transmitting means 106 and 110, electric motor means 92 and 94 and mirror 100 may be situated as within housing or carrier means, depicted in phantom line at 88c, which may be considered functionally similar or equivalent to the housing or carrier means 88 and 88b. Of course, in the embodiment of FIG. 10, the mirror 100 would be selectively variably positionable with respect to such means 88c. The housing or carrier means 88c, the mirror 100 and the other elements herein identified and illustrated within the bounds of phantom line 88c could be considered an overall electrically positionable mirror assembly 114 which, in turn, would be mounted preferably totally externally of the vehicle as to have the mirror 100 at a location viewable by the driver.

In FIG. 10, the second box-like configuration in phantom line at 116 is intended to depict the associated vehicle and the elements diagrammatically and schematically depicted therewithin may be considered as being situated within the interior of such vehicle 116.

In the preferred embodiment, a pair of electrical switches or control means 118 and 120 are provided as well as an electronic control unit (ECU) 122. A suitable source of electrical potential 124 is shown as going to ground potential as at 126 and electrically connected as to conductor means 128 which, in turn, is electrically connected to the ECU 122 and to a switch contact 130 of a switch assembly 132 having a switch member 134. The switch assembly 132 is preferably operated in conjunction with the vehicular engine ignition switch assembly (even possibly forming a part thereof) so that, upon closure of the ignition switch assembly by the driver, switch member 134 is closed against contact 130 and a circuit therethrough is completed. A conductor 136 leads as from switch contact 134 to switch or control assembly 118 and associated conductor means 138 similarly completes a circuit as from switch contact 134 to switch or control assembly 120. Additional conductor means 140 electrically interconnects switch assembly 120 and ECU 122. Both the ECU 122 and the switch or control assembly 118 are connected to ground potential as at 142 and 144, respectively.

The electric motor means 92 is electrically connected to the switch assembly 118 via conductor means 146 while electric motor means 94 is electrically connected to both the switch assembly 118 and the ECU 122 via conductor means 148 and branch conductor means 150.

Switch means 118 may be, as is well known in the art, a joystick type control having manually movable lever means 152 which, when moved by the driver in directions as generally indicated by arrows 154, 156, 158 and 160, causes directionally corresponding movement of mirror 100. For example: if control 152 were to be moved in the direction of arrow 154 electric motor means 92 would be energized as to rotate in a direction whereby, through motion transmitting means 106, mirror 100 would be rotated or pivoted as to elevate the scene viewed by the driver; if control 152 were to be moved in the direction of arrow 158 the same electric motor means 92 would be energized as to rotate in an opposite direction whereby, through the same motion transmitting means 106, mirror 100 would be rotated or pivoted in an opposite direction as to lower the scene viewed by the driver; if control 152 were to be moved in the direction of arrow 160 electric motor means 94 would be energized as to rotate in a direction whereby, through motion transmitting means 110, mirror 100 would be rotated or pivoted as to horizontally change the scene viewed by the driver to that further generally horizontally away from the vehicle; and if control 152 were to be moved in the direction of arrow 156 electric motor means 94 would be energized as to rotate in an opposite direction whereby, through the same motion transmitting means 110, mirror 100 would be rotated or pivoted as to horizontally change the scene viewed by the driver to that further generally horizontally toward or closer to the vehicle.

The method of operation and the operation of the embodiment of the invention of FIG. 10 would, preferably, be as follows. With the switch means 132 closed, the driver may choose to first move control means 152 in directions of either arrows 154 or 158 in order to achieve a desired elevation of the scene to be viewed. For purposes of clarity in description, let it be assumed that when the driver so positions the mirror 100 to the driver's desired and selected elevational view, the mirror is in a position as generally depicted in phantom line at 100c. Further, it may be assumed that in such position 100c, too much of the driver's vehicle is actually seen in the mirror. Therefore, the driver would then move control means 152 in the direction of the arrow 160 causing the mirror 100c (through means previously discussed) to rotate or pivot towards a position as depicted in solid line by mirror 100. Further, for purposes of description, let it be assumed that when the mirror is thusly rotated or pivoted to its depicted solid line position, the driver of the associated vehicle sees, within the mirror 100, just a slight portion of such vehicle, as depicted generally at 58 of FIG. 4, and stops further horizontal rotation of mirror 100 as by releasing or returning control means 152 to its null position. For ease of visualization, and subsequent reference, line 162 (an imaginary extension of the mirror 100) depicts such relative position. Then the driver would actuate the switch means 120, which may be a momentary type switch assembly, as by depressing switch button 163, thereby sending an electrical signal to the ECU 122 which, in turn, via conductor means 148, energizes motor means 94 to horizontally rotate mirror 100 to a view further away from the vehicle. Such further outward rotation of mirror 100 continues until a preselected number of additional degrees of relative rotation of the mirror 100 are achieved and, at that time, further outward rotation of the mirror 100 is stopped by the ECU 122. In FIG. 10, line 164 is employed as an imaginary extension of the mirror 100 when it (the mirror) attains a position corrresponding to said additional degrees of relative rotation by ECU 122. The angle X, as between lines 162 and 164, would be equivalent to the angle X of FIGS. 7 and 9 and as discussed with reference to the embodiments of FIGS. 6 and 7 and FIGS. 8 and 9. Once the mirror 100 has been thusly rotated to the position of line 164, through the additional angle X the view seen by the driver would be as generally depicted by $V_O$ of FIG. 5 which, as previously described, effectively eliminates the dangerous blind zone 62 of the prior art as depicted in FIG. 4.

In the preferred embodiment, an indicator light or lamp means 166 is provided and becomes energized upon the mirror 100 having been rotated or pivoted through said additional degrees of relative rotation by the action of the ECU 122. The energization of light 166 gives the driver visual indication that the mirror 100 has been rotated through the said additional degrees of relative rotation thereby having the driver know that the driver can trust the mirror's position to be proper and aimed for viewing into the blind zone of the prior art.

Further, still with reference to FIG. 10, in the preferred embodiment, the ECU 122 has electrical power continuously applied to it so that the ECU 122 can retain the memory that it has been actuated for positioning the mirror 100 for viewing into the prior art blind zone 62.

However, the driver is always able to check whether the position of the mirror 100 is correct, especially in the event that someone else has driven the vehicle, simply by again (as hereinbefore described) repositioning the mirror 100 as to see a view of a portion (as 58) of the vehicle and then actuating the switch button 163. The process of repositioning mirror 100, of course, employs the selective actuation of control means 152 and, if such actuation is undertaken and if at the start of such actuation light 166 should be in an energized state, such light 166 will become de-energized by the ECU 122 until after the ECU 122 is again called upon to move and does move mirror 100 through the angle X.

In FIG. 10 the switch means 118, switch means 120 and indicator lamp means 166 are illustrated as being separate devices; however, it is contemplated that such could be easily packaged into a unitary type assembly as by, for example, placing the actuating button 163 and indicator lamp means 166 into the extending end of the control member 152.

In order for the ECU 122 to be able to rotate the mirror 100 the additional angular displacement of angle X, the ECU 122 must, in effect, know just how far the mirror 100 has turned (as starting from a reference position 162 towards the desired position 164). One way of achieving this is to control the length of time ("on time") that motor 94 would be energized by the ECU 122 upon initiation of such action by switch means 120. Such, of course, could take the form of an appropriate R-C circuit, or any other timing circuit, within the ECU 122. This approach of controlling the "on time", of course, assumes that there would be no appreciable difference in the rotational speed of the motor 94 throughout all of its operating conditions.

Another way of measuring the amount or degrees of rotation of mirror 100 by motor 94, in response to the energization thereof by ECU 122, is to count the ripple pulses in the current of the drive motor 94. That is, all commutated d.c. motors, of the type employed in remote electrically positioned mirror assemblies, exhibit a ripple in the current and such ripple has a frequency equal to the speed of rotation of the motor multiplied by the number of commutator segments. Such ripples may be sensed (and amplified) directly within the ECU 122 since the current flow to the motor 94, at this time, is being supplied by the ECU 122. In such an arrangement, the number of ripples sensed would be directly proportional to the angular rotation of mirror 100 and, therefore, once the ripple counter associated with ECU 122 sensed the occurrence of that number of ripples (or pulses) which correspond to said desired angle X, ECU 122 would cease further energization of motor means 94.

Yet another way of controlling and/or determining the amount of angular rotation of mirror 100, due to the energization of motor 94 by ECU 122, is to employ any of a number of rotational sensors operatively connected to either the motor 94 or the motion transmitting means 110. Such rotational sensors, many of which are well known in the art, may employ optical, magnetic or electrical means as to monitor and indicate the degrees of rotation of the output shaft of motor 94 and/or the motion transmitting means 110 as by electrical pulses generated in response to such monitored rotation. Such a rotational sensor (or any of such) is schematically depicted as by the phantom line bracket at 168 and the pulses generated therewithin may be transmitted as via suitable conductor means 170 to the ECU 122. Again, in such an arrangement, the number of pulses generated and sensed would be directly proportional to the angular rotation of mirror 100 and, therefore, once the pulse counter associated with ECU 122 sensed the occurrence of that number of pulses which correspond to said desired angle X, ECU 122 would cease further energization of motor means 94.

Still another way of controlling and/or determining the amount of angular rotation of mirror 100, due to the energization of motor 94 by ECU 122, is to employ means for a direct measurement of the horizontally adjusted position of mirror 100. Such direct measurement means may take the form of, for example, a linear potentiometer operatively connected as to the mirror 100 and operationally offset horizontally from the mirror's vertically extending axis of rotation or pivoting. In such an arrangement, the ohmic resistance, provided by the potentiometer, when the driver adjusted the mirror 100 to a zero or reference position, depicted by line 162, would, in effect, constitute a zero or reference value fed to a micro-processor within the ECU 122. The micro-processor, in turn, would require an additional voltage value of, for example, 1.2 volts, from any such driver-established zero or reference value, in order to further move the mirror 100 as from position 162, through angle X, to the automatically properly finally adjusted position of 164 upon actuation of the ECU 122 by the driver depressing button 163 of switch means 120. Of course, as the motor 94 further adjusted mirror 100 through angle X, the voltage across the linearly changing ohmic value of the potentiometer would be fed back to the micro-processor and when the value thereof resulted in a matching of the assumed constant incremental value of 1.2 volts, the ECU 122 would cease further energization of the motor 94 and rotation of mirror 100.

As hereinbefore indicated, not all remotely positioned mirror assemblies are electrically operated in that some are remotely positioned by manual operation of associated motion transmitting means. Some of such remotely positionable manually operated mirror assemblies employ a joystick control connected to three motion transmitting cable assemblies which, in turn, are operatively connected to a variably positionable mirror. One such prior art structure is disclosed in U.S. Pat. Nos. 3,407,684 of which the disclosure, to the extent that it may be necessary to understand the overall operation thereof, is hereby incorporated by reference. Still other prior art remotely positionable manually operated mirror assemblies employ a joystick control connected to only two motion transmitting cable assemblies while the third cable assembly is dispensed with by the substitution of spring means continually urging the mirror in a direction resisted by the remaining two cable assemblies. By way of general example, the structure of said U.S. Pat. No. 3,407,684 could be converted to such a two-cable type of remote adjustment by eliminating the cable assembly 26, 26' thereof and substituting spring means as above the pivot 44 and between cables 22 and 24 thereof to operatively engage and urge the mirror 18 and carrier in a counter-clockwise direction as viewed in FIG. 6 of said U.S. Pat. No. 3,407,684.

Figure 11:
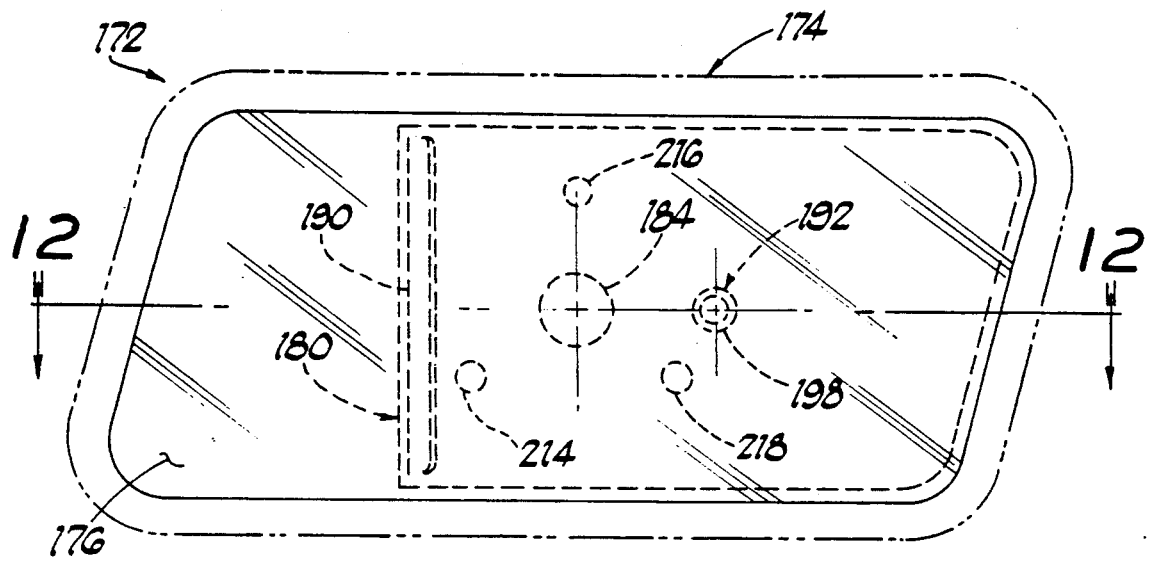
FIG. 11 is a view of still another mirror embodying teachings of the invention.
Figure 12:
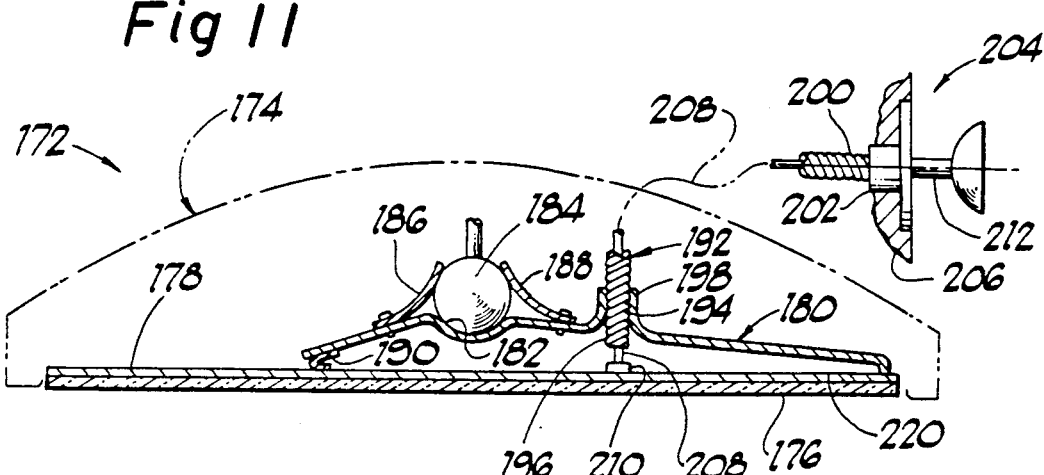
FIG. 12 is a cross-sectional view, taken generally on the plane of line 12—12 of FIG. 11 and looking in the direction of the arrows.
Figure 13:
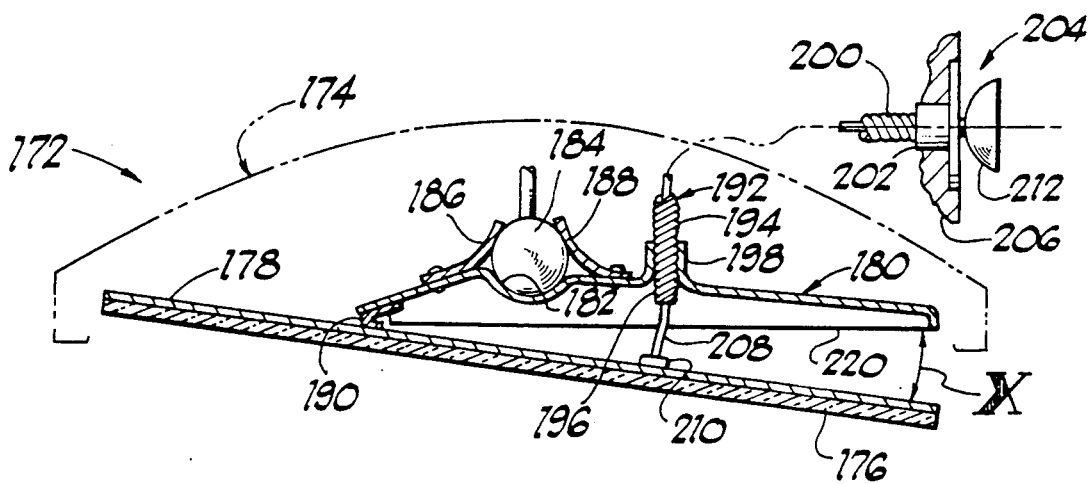
FIG. 13 is a view similar to that of FIG. 12 but illustrating the structure of FIG. 12 in a particular mode of operation.

FIGS. 11, 12 and 13 illustrate a manually remotely positionable mirror assembly employing teachings of the invention. For purposes of clarity, certain of the elements and/or details in FIGS. 11, 12 and 13 are shown in simplified form especially since such elements, per se, may be of any suitable form and will be clearly understood by those of ordinary skill in the art.

Referring in greater detail, FIGS. 11 and 12 illustrate a mirror assembly 172 which may be comprised of a housing or support means 174 and a mirror 176 which may be provided with suitable backing or support means 178. A body-like carrier 180, provided as with a spherical indentation 182, is operatively pivotally connected to a ball-like pivot 184 as by suitable spring-like retainer means 186 and 188. The pivot member 184 is rigidly carried as by the housing or support means 174 in any suitable manner and FIGS. 3 and 5 of said U.S. Pat. No. 3,407,684 illustrate, by way of example, one such arrangement. The carrier means 180 is, in turn, operatively secured to mirror 176 as by suitable hinging or pivoting means 190. In the preferred embodiment, such hinging means 190 would be secured to the mirror backing or support means 178.

A bowden cable assembly 192 has one functional end 194 of its sheath 196 suitably fixedly secured as to a formed tubular portion 198 of carrier 180 and has its other functional end 200 fixedly secured as to a control housing 202 of associated control means 204 carried as by the driver's door (a portion of which is shown at 206) of the vehicle. One end of the movable wire 208 of the cable assembly 192 is operatively secured to the mirror 176 as by suitable securing means 210 securing such wire 208 to the backing or support means 178. The other end of wire 208 is suitably connected as to an axially movable control member 212 carried by and forming a part of the control means 204.

As already indicated, the embodiment of the invention disclosed in FIGS. 11, 12 and 13 is directed to a mirror assembly of the manually remote adjustable type. However, for clarity, the various cable assemblies and joystick control therefor as are usually employed in such assemblies are not shown. In this regard, it is believed sufficient to note that if a three cable assembly control were to be employed, in combination with a joystick or the like, the ends of the moving wires of the respective cable assemblies could be operatively secured to the carrier 180 as at respective locations depicted at 214, 216 and 218 of FIG. 11. Such would be, in effect, functionally equivalent to the control wires 22, 26 and 24 of FIGS. 4, 5 and 6 of said U.S. Pat. No. 3,407,684 along with the joystick control 92 thereof If the embodiment of FIGS. 11, 12 and 13 were to be manually remotely controlled as by two cable assemblies, then, as previously discussed, 216 could be the point at which a spring is operatively connected to the carrier 180 while control wires could be operatively connected to the carrier as at 214 and 216.

In any event, it should now be apparent that the carrier means 180 and mirror 176 are, as a unit, remotely manually selectively adjustable as about support pivot 184 by the driver. With regard to FIG. 12, it can be seen that with the control member 212 withdrawn, wire 208 pulls mirror 176 and backing means 178 into abutting engagement with body or carrier 180 as by contacting end surface means 220 thereof. This abutting relationship will be maintained even though the carrier 180 and mirror 176 are adjustably pivotally moved about support pivot 184 because no relative longitudinal motion occurs as between the shroud or sheath 196 and its interior wire 208.

Referring primarily to FIGS. 11 and 12, let it be assumed that the driver has already adjusted the carrier 180 and mirror 176 as to provide the desired elevation of the scene to be viewed by the driver in the mirror 176 and then has further adjusted the carrier 180 and mirror 176, in the horizontal, as to thereby see, within mirror 176, just a slight portion of the driver's vehicle, as depicted generally at 58 of FIG. 4. Also let it be assumed that when such slight portion 58 of the driver's vehicle is seen in mirror 176, mirror 176 and carrier means 180 have attained a position as depicted in FIG. 12 and further adjustment of the carrier means 180 ceases. At this condition, the view presented by the outside mirror assembly 172 would be that as generally depicted in FIG. 4 defining a relatively large blind zone 62.

However, with the invention, the driver merely pushes the control member 212 to a second of its two operating positions, as depicted in FIG. 13, thereby causing wire 208 to longitudinally extend from shroud 196 and in so doing cause mirror 176 to be rotated or pivoted on hinging means 190 and assume a relative position as depicted in FIG. 13. The length of movement of control member 212 (and the wire 208 connected to it) from its position shown in FIG. 12 to its position shown in FIG. 13 is such as to result in said angle X being traversed by mirror 176. Said angle X, of course, is that angle which horizontally shifts the scene viewed by the driver to be in accordance with that depicted in FIG. 5 wherein the dangers of the (FIG. 4) blind zone 62 are eliminated.

Figure 14:
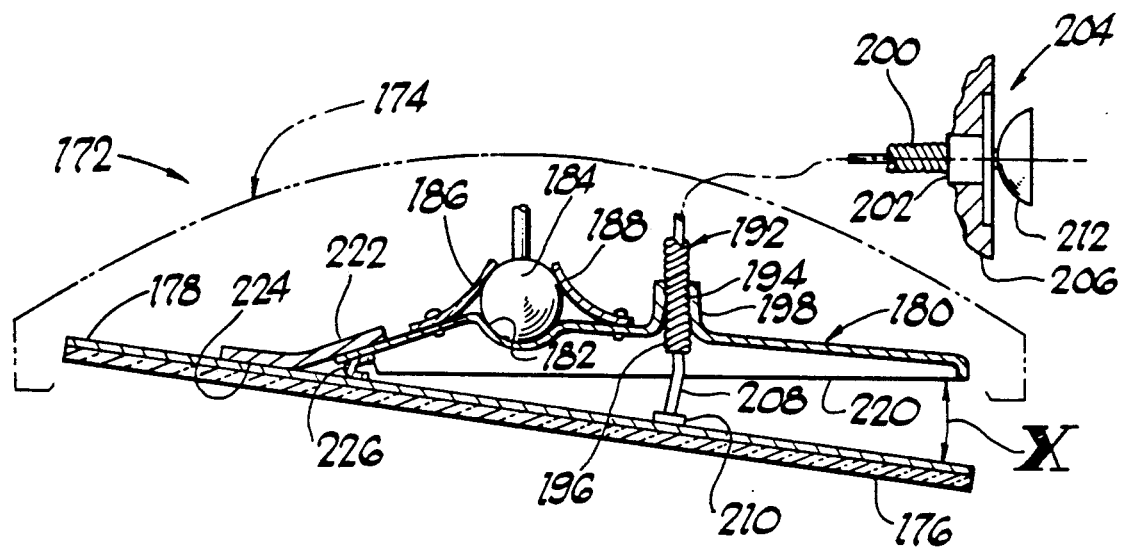
FIG. 14 is a view similar to FIG. 13 and illustrating a modification of the embodiment of FIGS. 11, 12 and 13.

FIG. 14, a view similar to that of FIG. 13, illustrates a modification of the invention as disclosed in FIGS. 11, 12 and 13. In FIG. 14 all elements, except as otherwise noted, which are like or similar to those of FIGS. 11, 12 and 13 are identified by like reference numbers. In the main, the difference between the embodiments of FIGS. 14 and 13 is that in FIG. 13 the angle X was determined by the length of the stroke or movement of control member 212 and the wire 208 moved thereby while in the embodiment of FIG. 14, the angle X is determined as by a positive abutment or stop means 222 suitably secured as to carrier 180 and having an abutment or stop surface 224 for operatively engaging the mirror 176 as by contacting the backing member 178. The embodiment of FIG. 14 also contemplates the provision of spring means normally urging the mirror 176 to the depicted position against stop surface means 224 thereby employing the control member 212 and wire 208 solely for drawing or moving the mirror 176 back into abutting condition against carrier surface means 220 (such condition being depicted in FIG. 12). If such spring means were to be employed, suitable restraining means as, for example, detent means could be employed in combination with the control member 212 to thereby hold the mirror 176 in operative abutting engagement with surface means 220 of carrier 180, against the resilient force of such spring means, when moved to such operative abutting engagement by the driver. In this regard it is contemplated that the hinging means 226 may in fact be a spring-like or resilient means normally urging the mirror 176 against stop surface 224. Of course, if desired, pure pivoting or hinging means could be employed and separate spring means, torsion or compression, provided for thusly urging the mirror against said stop 224.

Figure 15:
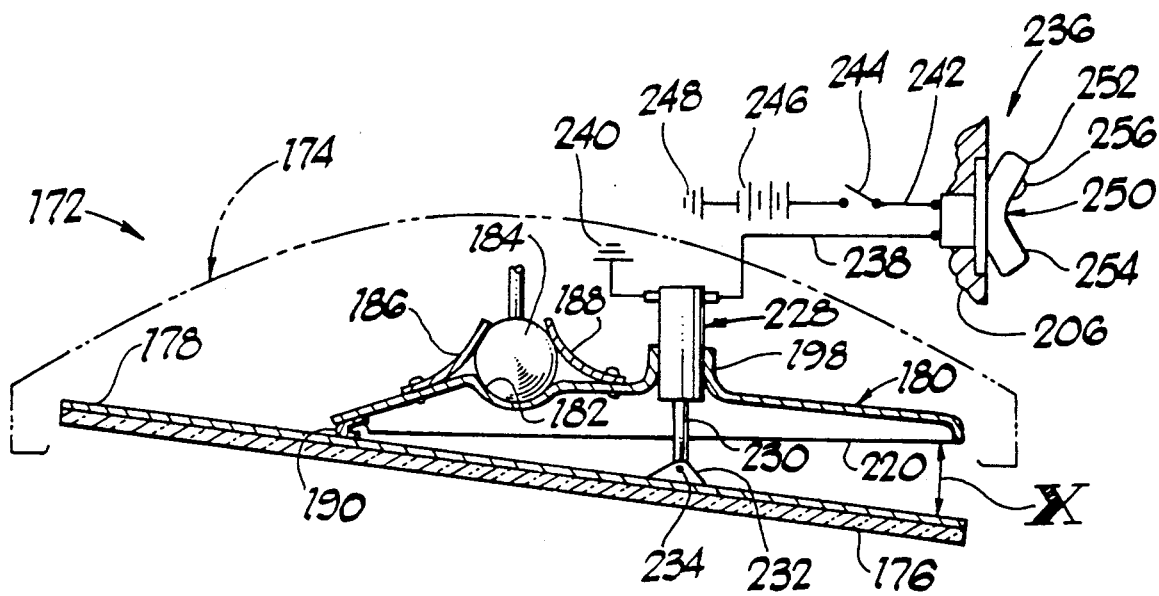
FIG. 15 is a view similar to both FIGS. 13 and 14 and illustrating another modification of the embodiment of FIGS. 11, 12 and 13.

FIG. 15, a view similar to either FIGS. 13 or 14, illustrates another modification of the invention as disclosed by FIGS. 11, 12 and 13. In FIG. 15, all elements, except as noted otherwise, which are like or similar to those of FIGS. 11, 12 and 13 are identified with like reference numbers.

In the embodiment of FIG. 15, instead of cable means 192 (as employed in the embodiments of FIGS. 11–14) a solenoid assembly 228, securely held as by portion 198, is employed to move the mirror 176 through said angle X to the depicted position. More particularly, the armature 230, operatively connected to the mirror 176 as by suitable bracket 232 and pivot means 234, would have a stroke the length of which would result in the achievement of said angle X. In this embodiment it is preferred that spring means normally urge the mirror 176 back to a closed or abutting position against surface means 220 of carrier means 180. Such spring means may, as is well known in the art, form a part of the solenoid assembly 228 and normally urge the armature means 230 upwardly (as viewed in FIG. 15) into the housing of the armature assembly 228 as to be in a fully contracted position at which stime the mirror 176 would be operatively abutting carrier surface means 220. Of course, separate spring means could be provided for moving the mirror 176 operatively against surface means 220. For example, in the embodiment of FIG. 15 the hinging or pivoting means 190 may be of the type as shown at 226 of FIG. 14 and described with reference thereto so that the hinging means itself would provide the resilient force normally urging mirror 176 toward operative abutting engagement with surface means 220.

As described with reference to FIGS. 11, 12 and 13, once the carrier 180 and mirror 176 are adjusted by the driver to the initial position depicted in FIG. 12 (that being when the driver views the said small portion 58 of the driver's vehicle) what the driver, of the vehicle equipped with the embodiment of FIG. 15, does is to close an electrical circuit as to energize the solenoid or electrical motor means 228 as to thereby move mirror 176 through said angle X. More particularly, a butterfly or rocker type switch assembly is depicted at 236 and has conductor means 238 leading therefrom and to a terminal of the solenoid means 228. Another terminal of the solenoid 228 is shown as being brought to ground potential as at 240. A second conductor means 242, comprising serially situated switch means 244 preferably closed by and when the vehicle ignition switch is closed, serves to electrically interconnect a source of electrical potential 246 which is led to ground potential as at 248, with switch means 236.

The switch member 250, of switch assembly 236, is selectively engageable and actuated by the driver. As generally depicted, and as known in the art, the switch member 250 may be considered as having generally oppositely situated arm portions 252 and 254 which are engageable by the driver and alternately depressible. With the switch means 244 (which may in fact comprise a portion of the vehicular ignition switch assembly) closed, when the driver pushes switch arm 252 a circuit is completed through the switch means 236 and conductor 238 resulting in the energization of solenoid means 228 and consequent movement of mirror 176 through said angle X. Once the solenoid means 228 is thusly energized the switch means 236 maintains the circuit therethrough closed as to maintain energization of the solenoid motor means 228. Also, as generally indicated at 256, suitable indicator light or lamp means may be provided as to become energized, whenever solenoid means 228 is energized, thereby providing a visual indication of such condition to the driver.

If the driver should desire, for some reason, to again reposition the mirror 176, the driver can depress switch arm 254 and so as to open the circuit through switch means 236 and thereby de-energize solenoid 228 returning the mirror 176 into operative abutting engagement with surface means 220 at which time the driver could again reposition the carrier 180 and mirror 176, as a unit, as by the associated manually actuatable cable assemblies. Of course, as illustrated, in the preferred embodiment, whenever the vehicular ignition switch is opened, the circuit through conductor means 242 is opened and solenoid means 228 becomes de-energized with mirror 176 returning to operative abutting engagement with surface means 220.

As should now be apparent, the invention as herein disclosed and described provides many benefits over that as practiced by the prior art. For example, the blind zone 62 of FIG. 4 is effectively eliminated and the dangers thereof are, for all practical purposes, totally eliminated which results in safer driving in traffic. Further, as practiced by the prior art and depicted in FIG. 4, one limit 26 of the viewing angle $V_O$ includes a substantial portion of the roadway lane 48 rearwardly of vehicle 10. Consequently, if a second vehicle were in the same lane 48 and following vehicle 10, the light from the headlights or headlamps (or at least one of such) of the second following vehicle would strike the mirror 14 and cause glare for the driver of vehicle 10. However, with the invention, as depicted in FIG. 5, the viewing angle $V_O$ has been horizontally swung further outwardly and therefore the light from any of the headlamps of such a second following vehicle in lane 48 cannot strike mirror 14 in such a manner whereby it is reflected as glare into the eyes of the driver of vehicle 10. Also even when, as depicted in FIG. 5, vehicles such as 56 and 68 are in the adjacent lane 46 and in the process of passing vehicle 10 the light, from their headlamps, as they pass through viewing angle $V_O$, is what may be considered peripheral light and not as intensely focused thereby greatly diminishing any glare effect in mirror 14 for the driver of vehicle 10. In this regard, it should also be noted that if all other conditions of operation are considered equal, the length of time that a headlamp, of a vehicle in the adjacent lane 46, will exist within the viewing angle $V_O$ of FIG. 5 is significantly shorter than the time that such headlamp would exist within the viewing angle $V_O$ of FIG. 4.

Another important benefit arises as in those situations wherein a vehicle, practicing the invention, enters an expressway as from an entrance ramp. That is, because at such time, while still on a portion defining the entrance ramp, the longitudinal axis of the vehicle is still at a significant angle with respect to the longitudinal axis of the expressway lane on which the vehicle intends to travel, the more outwardly aimed viewing angle $V_O$ of the invention (and as depicted in FIG. 5) better enables the driver to see whether other vehicles are approaching in the same expressway lane.

Also, both the inventive method and apparatus herein disclosed and described provides the driver with a familiar reference by which the driver can be assured that the outside rear view mirror is ultimately properly positioned as to eliminate the dangers of the blind zone 62 of the prior art.

Still further, the inventive apparatus herein disclosed and described, by its mere presence on a vehicle, would raise the question as to its purpose and operation. The purpose and operating instructions could, of course, be explained: (a) as in the vehicle manufacturer's operating instructions; (b) the mirror manufacturer's operating instructions; or (c) in drivers' education classes. Any of such would, of course, have the end result of reducing driving hazards and injuries.

With reference generally to FIGS. 4 and 5, even though in the preferred method and embodiments of the invention, the mirror 14 is rotated outwardly in the order of 7.5° so as to angularly move the viewing angle $V_O$ thereof in the order of 15.0° from its prior art position in FIG. 4 to the inventive position of FIG. 5, the full benefits of the invention can be obtained when such mirror 14 is rotated outwardly anywhere in the range of 4.5° to 10.5° from its prior art position of FIG. 4 to the inventive position as generally depicted and contemplated by FIG. 5 thereby correspondingly rotating the viewing angle $V_O$ thereof in the range of 9.0° to 21.0°. In such situations, within such identified range, the value of said angle X would then also correspond to the range of 4.5° to 10.5°. That is, in a rear view mirror which was intended to be rotated angularly outwardly in the order of, for example, 5.5°, the related angle X of such mirror would also be in the order of 5.5°.

Further, it should be pointed out that when the inventive method is carried out with said angle X being in the order of 7.5° the outside viewing angle $V_O$ is caused to swing outwardly to where the inner limiting ray line 26a thereof does not intersect the limiting ray line 20, of the viewing angle $V_I$, anywhere over the full width of the adjacent traffic lane 46. This is depicted in FIG. 5.

In order to further define certain terms or expressions as may be employed in the appended claims: (a) the term "inside viewing angle" means viewing angle $V_I$ as of either FIGS. 1, 4 or 5 and provided as by an interior mirror 12; (b) the term "driver's side limiting ray" of the inside viewing angle means the angular limit of such inside viewing angle as depicted by ray line 20 of FIGS. 1, 4 or 5; (c) the term "passenger's side limiting ray" of the inside viewing angle means the angular limit of such inside viewing angle as depicted by ray line 22 of FIGS. 1, 4 or 5; (d) the term "outside viewing angle" means viewing angle $V_O$ as of either FIGS. 1, 4 or 5 and provided as by an outside mirror 14; (e) the term "outer limiting ray" of the outside viewing angle means the angular limit of such outside viewing angle as depicted by ray line 24 of either FIGS. 1 or 4 or ray line 24a of FIG. 5; and (f) the term "inner limiting ray" of the outside viewing angle means the angular limit of such outside viewing angle as depicted by ray line 26 of either FIGS. 1 or 4 or ray line 26a of FIG. 5.

Although only a select number of embodiments of the invention and methods of practicing the invention, all of which are at this time considered to be the best mode of practicing the invention, have been disclosed and described, it is apparent that other embodiments and modifications of the invention are possible within the scope of the appended claims.

What is claimed is:

1. In combination an automotive vehicle and a remote control mirror assembly carried by said vehicle externally thereof and generally along a side of said vehicle, comprising mirror means selectably positionable by an operator of said vehicle, support means for supporting said mirror means, positioning means operatively connected to said mirror means and effective to rotationally position said mirror means with respect to said support means and said vehicle, control means situated remotely from said mirror means and operatively connected to said positioning means, said control means being adapted for actuation by said operator, wherein said mirror means comprises a main viewing mirror portion having a main reflective surface of flat planar configuration for viewing therein by said operator of existing conditions of traffic, said main viewing mirror portion comprising an outer periphery with first and second peripheral portions, wherein said first peripheral portion is situated relatively closer to said side of said vehicle and wherein said second peripheral portion is situated relatively farther from said side of said vehicle, and a gauging viewing mirror portion having a gauging reflective surface of flat planar configuration for viewing therein by said operator a selected referencing portion of said vehicle carrying said mirror assembly, wherein said gauging viewing mirror portion in its entirety is relatively small compared to said main viewing mirror portion in its entirety, wherein said gauging viewing mirror portion is situated as to be at least close to said first peripheral portion and remotely spaced from said second peripheral portion, and wherein the plane of said main reflective surface and the plane of said gauging reflective surface are inclined with respect to each other so that when said operator of said vehicle actuates said control means to cause said mirror means to be positioned so that said selected referencing portion of said vehicle is viewed in said gauging reflective surface of said gauging viewing mirror portion said main reflective surface of said main viewing mirror portion is simultaneously properly positioned providing a view to said operator which is angularly outward from the view provided to said operator by said gauging viewing mirror portion for viewing said existing conditions of traffic in said main viewing mirror portion.

2. The combination according to claim 1 wherein said positioning means comprises electric motor means, and wherein said control means comprises electric switch means electrically connected to said electric motor means.

3. The combination according to claim 1 wherein said positioning means comprises cable means, wherein said control means comprises manually actuatable mechanical lever means operatively connected to said cable means.

4. The combination according to claim 1 wherein said main viewing mirror portion comprises a main mirror body, wherein said gauging viewing mirror portion comprises a gauging mirror body, and wherein said gauging mirror body is carried by said main mirror body.

5. The combination according to claim 4 wherein said main mirror body and said gauging mirror body are physically separate bodies, and wherein said gauging mirror body is operatively secured to said main mirror body.

6. The combination according to claim 5 wherein said gauging mirror body is operatively secured to said main mirror body by adhesive means.

7. The combination according to claim 1 wherein said main viewing mirror portion comprises a main mirror body, and wherein said gauging viewing mirror portion is formed into said main mirror body.

8. The combination according to claim 1 wherein said gauging viewing mirror portion is situated within the bounds of said outer periphery.

9. The combination according to claim 1 wherein the plane of said main reflective surface and the plane of said gauging reflective surface are inclined with respect to each other as to form angles being a maximum of 10.5°.

10. The combination according to claim 1 wherein the plane of said main reflective surface and the plane of said gauging reflective surface are inclined with respect to each other as to form angles of intersection therebetween with the smaller of said angles being a minimum of 4.5°.

* * * * *

UNITED STATES PATENT AND TRADEMARK OFFICE
CERTIFICATE OF CORRECTION

PATENT NO. : 5,050,977
DATED : September 24, 1991
INVENTOR(S) : George E. Plazter, Jr.

It is certified that error appears in the above-identified patent and that said Letters Patent is hereby corrected as shown below:

Column 5, line 41, add as a start of a new paragraph --- An analysis of the diagram of Figure 3 shows that: ---.

Column 5, change the first-appearing equation to be:

$$V_T = 2\tan^{-1} \frac{\overline{AB} + \overline{CD}}{2\,\overline{EO}}$$

Column 5, change the second-appearing equation to be:

$$V_B = 2\tan^{-1} \frac{\overline{AB} - \overline{CD}}{2\,\overline{EO}}$$

Column 20, line 63 (Claim 1, line 41 thereof), change "outward" to --- outwardly ---.

Signed and Sealed this

Twelfth Day of October, 1993

Attest:

BRUCE LEHMAN

*Attesting Officer*      *Commissioner of Patents and Trademarks*